United States Patent [19]

Lavy et al.

[11] Patent Number: 5,284,887

[45] Date of Patent: Feb. 8, 1994

[54] COMPOSITION FOR COATING CONCRETE

[75] Inventors: Avraham Lavy, Ramat Gan; Yuri Margulis, Ashdod, both of Israel

[73] Assignee: Aldema Ltd., Ashdod, Israel

[21] Appl. No.: 854,325

[22] Filed: Mar. 19, 1992

Related U.S. Application Data

[63] Continuation-in-part of Ser. No. 631,326, Dec. 20, 1990, abandoned.

[30] Foreign Application Priority Data

Dec. 20, 1990 [IL] Israel .................................. 92917

[51] Int. Cl.$^5$ .................................................... C08L 95/00
[52] U.S. Cl. ........................................ 524/62; 524/68; 524/69; 524/71
[58] Field of Search .................... 524/62, 68, 69, 71

[56] References Cited

U.S. PATENT DOCUMENTS

| | | | |
|---|---|---|---|
| 3,846,362 | 11/1974 | Reinecke et al. | 524/66 |
| 4,175,978 | 11/1979 | Marzocchi et al. | 524/68 |
| 4,305,855 | 12/1981 | Bretz | 524/62 |
| 4,403,067 | 9/1983 | Uffner | 524/71 |
| 4,547,225 | 10/1985 | Grossi et al. | 524/71 |

FOREIGN PATENT DOCUMENTS 0031341 2/1991 Japan ................................ 524/71

*Primary Examiner*—Paul R. Michl
*Assistant Examiner*—Peter Szekely
*Attorney, Agent, or Firm*—Edwin D. Schindler

[57] ABSTRACT

A composition for application to a concrete asphalt substrate, such as highways, landing strips of airfields and the like, which forms an uppermost protective layer. The composition penetrates to a certain small depth of the existing substrate. The result is an improved resistance to mechanical stress and to surface abrasion as well as against deterioration as a result of solar radiation. Water penetration is greatly reduced and friction is not reduced.

Main components of the composition are an acryl type or styrene type monomer, bitumen and a mineral particulate filler, and a UV protective agent. Certain compositions can contain additional components as well.

11 Claims, No Drawings

COMPOSITION FOR COATING CONCRETE

CROSS-REFERENCE TO RELATED APPLICATION

This application is a continuation-in-part of application Ser. No. 07/631,326 filed Dec. 20, 1990, now abandoned.

FIELD OF THE INVENTION

The invention relates to novel formulations which are applied as protective layer on asphalt road surfaces, on runways of airfields, asphalt surfaces in industrial use, roofs and the like. The protective layers impart to the underlying structure essential impermeability to water penetration, enhanced protection against damage by solar radiation and against attack by a variety of chemicals. The protective layer also affords a considerable protection against oxidation of underlying asphalt, either by itself or as a component of various compositions.

The penetration is to a small depth only and it depends, of course, on the underlying substrate. Generally the impregnated layer extends to a few millimeters, with the main percentage of the composition being in the upper 2 or 3 millimeters. A further result is abrasion resistance and no reduction of friction.

BACKGROUND OF THE INVENTION

Asphalt concrete compositions, especially those used under considerable mechanical and environmental stress, do not fulfill quality requirements and require extensive repairs and also periodical replacement. Research in this field concentrates on the optimization of the compositions used, in an endeavour to attain adequate protection against oxidation and mechanical deterioration. Hitherto a wide variety of additives has been proposed but still no satisfactory compositions have come into use.

In U.S. Pat. No. 4,737,538, Halper, there are described polymer concrete compositions which are used for forming solid bodies. The moldable compositions of Halper comprise a thermosetting resin and a rubber component. The cross-linking resins used are of importance in the production of rigid solid bodies, and are not desired in compositions which ought to be essentially flexible and resilient. The curable compositions of Halper differ in cardinal features from those of the present invention which is by no means suited for forming rigid solid bodies.

SUMMARY OF THE INVENTION

There are provided compositions for application as protective layer on asphalt surfaces, concrete-asphalt surfaces and any similar structures based on asphalt or its equivalents. There are also provided means for impregnating the surface layer of such structures, so as to attain a protective layer of a predetermined depth, which enhances mechanical stability, reduces to a large extent oxidation, provides protection against penetration by water, such layer having certain elastic properties. The exposure of bitumen to vapors of the monomer bring about a gradual modification of the properties of the bitumen.

The protective layers remain effective over a wide range of temperatures, from about −50 degrees C to about 80 degrees C, without an appreciable change. The surface layer according to the invention withstands the deleterious effects of UV radiation for prolonged periods of time, reducing ageing and erosion. The novel protective layer is of special importance when applied to concrete asphalt surfaces: roads, runways, roofs, industrial structures and the like. The novel compositions can be applied to a large variety of concrete asphalt or asphalt substrates. The use on such substrates having a predetermined porosity, which will generally be in the 3 to 8 percent range, is preferred. Generally the order of magnitude of the protective layer is about 0.7 kg/m2 to about 4 kg/m2 surface, resulting in a certain penetration into the substrate, thus forming a layer with a decreasing content of the important ingredients as a greater depth is reached. Thus there is formed a layer which affords the required protection.

The compositions of the invention are applied to an existing concrete-asphalt surface, and penetration is of an order of a few millimeters, with a gradual decrease from the surface to a greater depth. Generally, the penetration is of the order of a few millimeters, with the greater part of the applied composition being in the first 2 or 3 millimeters.

The main ingredients of the compositions are a monomer, or monomer mixture selected from methyl methacrylate, acrylate and styrene, a certain percentage of bitumen and a mineral particulate filler, together with an UV protective and stabilizing agent. A preferred UV protective and stabilizing agent is phenol, present in a quantity of up to about 1 weight-percent, and preferably in the 0.1 percent to about 0.4 weight-percent range.

No curing agent is required as under normal atmospheric conditions the monomer or monomer mixture undergoes polymerization within a rather short period of time. A small quantity of a compound such as oleic acid is beneficial. Water is not required; some water may be added, even if it is not required, when a change of viscosity is desired. The compositions of the invention are also useful in the rejuvenation of concrete-asphalt roads and airfield strips which have undergone deterioration. In certain such cases it is necessary to apply a somewhat greater quantity of the composition, and the penetration will be of the order of some millimeters.

According to a preferred embodiment of the invention the compositions contain from about 50 to 80 weight-percent of a fine grain mineral mixture, a polymer, a suitable carboxylic acid or dibutyl phthalate serving as plasticizer. It is advisable to incorporate a suitable commercially available antioxidant. There may be used minerals like finely ground marble, limestone, granite, dolomite, talc, Band, etc., of predetermined particle size distribution. It is a further object of the invention to provide improved structures, such as roads, runways, roofs, etc., which have improved resistance against mechanical stresses and which also afford protection of the asphalt against ageing, the structure of the invention acting as a mechanical buffer system, and this as due to the surface impregnation.

The noise of wheels moving on such surfaces is decreased by about 10 to 40 percent and surface friction is increased.

Compositions of the invention contain, by way of example, from about 15 to 25 weight-percent bitumen, which can be used in different qualities and types.

There is used a monomer or monomer mixture of the styrene or acryl type referred monomers are selected from methyl methacrylate, styrene, acrylate and the like. The monomers or monomer mixtures generally comprise about 10 to about 25 weight-percent of the composition.

A fine-grain mineral filler: about 50 to about 80 weight-percent, a suitable monomer or monomer mixture, like methylmethacrylate, advantageously also about 1 to 3 weight-percent oleic acid, about 0.1 to about 0.8 weight-percent phenol. The use of water is optional. The compositions must be adjusted to the specific intended use. It as clear that there may be used a wide variety of different components which are equivalents of the above.

The invention is illustrated with reference to the following examples, which are by way of illustration only:

According to a preferred technology, the bitumen is heated gradually to about 120 to 160 degrees C, mixed in a high speed mixer with the monomer and the solids and agitated for about 30 minutes to one hour. Typical compositions have a viscosity of about 250 to 350 CST at 25 degrees C. The compositions can be stored in a closed container for up to about one year.

It is stressed that the components of the novel composition are comparatively very inexpensive and this makes possible a wide application to existing concrete asphalt surfaces where cost is an important factor. A further important use is as an impregnating layer on existing roof surfaces.

EXAMPLE 1

Impregnation Composition

The following composition was prepared as set out below and it was tested and found of great Use for the impregnation of asphalt-concrete surfaces such as concrete-asphalt roads and runways, roofs, concrete construction and the like.

In the following parts are parts by weight:

| Bitumen (blown, 75/25) | 16 |
| Ground dolomite, about 250 mesh | 60 |
| Methylmethacrylate monomer | 14 |
| Oleic acid | 1.5 |
| Phenol | 0.3 |

After heating and mixing, a black viscous composition is obtained which is used for the impregnation of existing surfaces as set out above. The rate of application is generally in the 1 kg.m2 to about 3 kgm2 rate. The composition is applied as homogenously as possible and it dries and is usable after a period of about one hour. The resulting protective layer, which extends for a few millimeters, is long lasting and withstands weathering over prolonged periods of time. Water penetration is generally negligible.

EXAMPLE 2

A composition was prepared as set out in Example 1, but with an equal weight of flyash instead of ground dolomit. A viscous composition is obtained which is used as set out above. The rate of application is generally between about 1 kg/m2 to about 2 kg/m2. A near water impermeable, weather resistant and wear resistant surface layer is obtained.

EXAMPLE 3

A composition was prepared according to Example 1 but with it parts by weight styrene monomer instead of methyl methacrylate. A similar composition was obtained and similar properties of impregnated surfaces were obtained.

EXAMPLE 4

A composition was prepared according to Example 2, but with a 50/50 monomer mixture of methylmethacrylate and styrene. A highly resistant protective layer is obtained when applied to porous concrete or similar substrates at a rate of about 0.7 kg/m2 to about 2 kg.m2.

EXAMPLE 5

A composition was prepared according to Example 3, but with the following mineral components:

| Fine sand | 36 |
| Finely ground mineral (dolomite) | 56 |

When applied to a suitable substrate at a rate of 2-4kg/m2 after curing there is obtained a highly water-impervious surface layer.

Various compositions of the invention were subjected to accelerated ageing tests according to standard conditions, according to ASTM G 53. The tests were carried out for 500 and 1,300 hours with concrete substrates of varying porosity. At the end of the test a water pressure of 1000 Mm was applied for 14 days. At the end of the test period no water penetration had taken place.

EXAMPLE 6

A composition for impregnating concrete asphalt was prepared as set out above, comprising

| Silica (about 250 mesh) | 50 |
| Bitumen (blown 75/25) | 25 |
| Styrene monomer | 22 |
| Oleic acid | 2 |
| Phenol | 1 |

The adhesion of the liquid to the particulate matter was reduced but satisfactory impregnations resulted when using this composition.

EXAMPLE 7

A composition was prepared as set out in Example 1 but instead of dolomit an identical percentage of kaolin was used. The resulting impregnation had an increased degree of resiliency.

EXAMPLE 8

A composition was prepared according to Example 1, but there was added an additional 2 weight-percent of dibutyl phthalate. An impregnation having a high elasticity was obtained, which is especially suited for roof impregnations.

EXAMPLE 9

A composition was prepared according to Example 1 without oleic acid and containing 3 weight-percent dibutyl phthalate. An impregnation was obtained which has a high degree of elasticity and which was especially suited for application to concrete asphalt roofs.

The compositions of the invention can be applied to conventional asphalt road surfaces. These have generally a bitumen content of about 5 to 7 percent. According to the invention it has been found that a novel system of substrate/protective layer gives improved results as regards resistance to vibrations, shocks, stresses by pressure. Such a system comprises an asphalt concrete and similar composition layer of increased porosity, which contains only from about 3 to 5 weight-percent bitumen, and which has a thickness which is generally of not less than 5 cm thickness, to which a composition of the invention, such as one of the foregoing examples is applied. The actual protective layer comprises the upper one or 2 millimeters, although a deeper penetration takes place into crevices, etc. Such a water-impervious surface layer with the underlying structure which forms a mechanical buffer system of improved stress resistance, provides long lasting roads, runways, roofs, etc. The upper layer also affords chemical protection against ageing of the asphalt and against its oxidation, thereby drastically reducing maintenance costs compared with conventional roads, runways and the like.

The coating also reduces wheel noise on roads coated with such a composition.

The following results were obtained with a coating composition according to Example No. 3:

35 mm thick asphalt concrete cast sheets of the typed Used in roads and runways were used as substrate.

The above sheets were coated with a composition of Example 3, at approximately 1 kg/m2.

The aim of the test was to determine the influence of the coating on water penetration and the changes of this property after accelerated UV ageing.

Water penetration was tested on the following types of samples:
(1) Without coating
(2) Coated with a composition of Example 3, unaged;
(3) Coated with Example 3, after exposure to 500 hours UV;
(4) Sample after 1300 hours UV radiation.

Conditions of UV Radiation

Q-U.V. Panel in accordance with ASTM G-53. Cycles of 8 hours radiation at 60 degrees C followed by 4 hours 100 percent humidity at 50 degrees C.

Test Procedure

On the sheet samples an 80 mm diameter funnel was placed, to which a 1,000 mm high burette was fixed. The contact of the funnel to the sheet was sealed by epoxy and the set-up was filled with water. The drop of the water level in the burette was recorded from time to time during 14 days.

The results are expressed in ml. of water seepage.

| No. of days | Sample without Coating (Comparison) | Sample coated with Example No. 3 - unaged | Sample after 500 hrs. U.V.-aged |
|---|---|---|---|
| 1 | 50 ml./hour | −0.1 | −0.2 |
| 2 | | −0.2 | −0.3 |
| 3 | | −0.2 | −0.35 |
| 6 | | −0.2 | −0.4 |
| 7 | | −0.3 | −0.4 |
| 8 | | −0.4 | −0.45 |
| 9 | | −0.4 | −0.5 |
| 10 | | −0.45 | −0.55 |
| 14 | | −0.7 | −0.7 |

| Sample after 1300 hours exposure to UV Radiation | | |
|---|---|---|
| Number of days: | 0 | 0 |
| | 4 | −0.25 |
| | 5 | −0.25 |
| | 6 | −0.35 |
| | 7 | −0.40 |
| | 12 | −0.60 |
| | 13 | −0.70 |
| | 14 | −0.70 |

Conclusion

Water penetration through the original sample and samples after 500 hours and after 1,300 hours UV exposure is practically identical, i.e. UV radiation has no effect on water penetration.

At the rate of application generally used, in the order of from about 0.7 kg/m2 to about 4 kg/m2, the composition penetrates into the top layer of the concrete asphalt surface and impregnates this layer. Practically no actual layer is formed on top of the original one and the main quantity of impregnating composition is concentrated in the upper 0.7 to 1 mm. Concrete asphalt surfaces of roads and the like have a certain porosity and this facilitates the penetration of the compositions of the invention into the uppermost layer of such existing surface.

A comparative study was carried out under my direct super-vision to determine the frictional properties of a composition of the present invention—as defined below—, with a composition according to the cited U.S. Pat. No. 4,737,538, according to the example defined at the top of column 8 of this U.S. patent, with slight modifications depending on the availability in Israel of certain components. I believe that the composition tested is essentially the same as regards its properties, as that of the said example.

The exact compositions of the composition tested was as follows:

| | |
|---|---|
| Unsaturated polyester No. 555, produced by Makhteshim Ltd., Israel: | 400 g |
| Rubber solution of unsaturated polyester (1 part) and styrene monomer, (2 parts) | 100 g |
| Fly ash | 333 g |
| Benzoyl peroxide catalyst | 10 g |

A comparison was carried out between a composition of the present invention and one according to the Halper U.S. Pat. No. 4,737,538. The composition of the present invention consisted of:

| | |
|---|---|
| Bitumen 25/75 | 360 g |
| Styrene monomer | 330 g |
| Oleic acid | 20 g |
| Phenol | 4 g |
| Dolomite powder (-250 mesh) | 1100 g |

The test was done on three different kinds of asphalt pavements, which exist for a number of years, as set out in the following Table.

The material was applied to the surface of the road at a rate of 1 kg per square meter. The test was carried out after 24 hours, according to ASTM L-303-83, using the British Pendulum Tester, for measuring frictional surface properties.

On each surface there were carried out three measurements, at various locations.

The results are summarized in the following:

| Test No. | Asphalt Surface without coating dry | Asphalt Surface without coating wet | Invention dry | Invention wet | Halper dry | Halper wet | Tested Surface |
| --- | --- | --- | --- | --- | --- | --- | --- |
| 1 | 32 | 28 | 35 | 25 | 12 | 11 | Road, 7 years |
| 2 | 30 | 27 | 31 | 26 | 16 | 13 | old, filler; |
| 3 | 36 | 25 | 37 | 29 | 14 | 12 | dolomite |
| 4 | 35 | 27 | 37 | 28 | 12 | 13 | Road, 2 years |
| 5 | 44 | 28 | 40 | 22 | 15 | 11 | old; Filler, |
| 6 | 41 | 22 | 46 | 24 | 11 | 9 | dolomite |
| 7 | 39 | 25 | 39 | 26 | 18 | 11 | Road, 5 years |
| 8 | 37 | 27 | 38 | 30 | 13 | 14 | old Filler |
| 9 | 41 | 22 | 40 | 26 | 16 | 10 | Bazalt |
| Average: | 37.2 | 25.7 | 38.1 | 26.2 | 14.1 | 11.6 | |

The above tests indicate that the composition according to the U.S. patent decreases the friction of the asphalt road surface, whereas that of the present invention is close to that of the untreated surface.

We claim:

1. A composition for application to a concrete asphalt substrate, so as to form an integral protective uppermost layer, consisting of:

A monomer or a monomer mixture selected from the group consisting of from about 10-20 weight-percent of methyl methacrylate, styrene and acrylate, and a combination thereof:

15-25 weight-percent of bitumen;

50-80 weight-percent of a mineral particulate filler;

0.1-1 weight-percent of a UV protective and formulation stabilizing agent.

1 to 3 weight-percent of a carboxylic acid or dibutyl phthalate as plasticizer.

2. The composition according to claim 1, wherein said UV protective and formulation stabilizing agent is approximately 0.1-0.4 weight-percent of phenol.

3. The composition according to claim 1, wherein said mineral particulate filler is a member selected from the group consisting of gravel of different particle sizes, sand, pulverized mineral and a combination thereof.

4. The composition according to claim 1, further consisting of in combination with the bitumen component, a member selected from the group consisting of petrolatum, paraffin wax, ozocerite and a combination therefore.

5. A combination according to claim 1, containing up to about 2 weight-percent oleic acid.

6. A concrete surface having improved mechanical strength and increased weathering resistance, consisting of:

a bitumen-concrete substrate layer having a thickness of at least 3 cm; and, a composition which is applied to said bitumen-concrete substrate, said composition consisting of:

a monomer or a monomer mixture selected from the group consisting of from about 10-20 weight-percent of methyl methacrylate, styrene, acrylate, and a combination thereof;

15-25 weight-percent of bitumen;

50-80 weight-percent of a mineral particulate filler; and, 0.1-1 weight-percent of a UV protective and formulation stabilizing agent, said composition being applied to said bitumen-concrete substrate layer at a quantity of from 0.5 kg/m2-4 kg/m2 so as to form an essentially water-impervious surface layer.

7. A concrete surface having improved mechanical strength and increased weathering resistance according to claim 6, wherein said bitumen-concrete substrate layer contains less than 5 percent by weight bitumen or an equivalent thereof.

8. A concrete surface having improved mechanical strength and increased weathering resistance according to claim 6, wherein said bitumen-concrete substrate layer has a thickness of above 3 cm.

9. A process for producing a concrete surface having improved mechanical strength and increased weathering resistance, consisting of the step of:

applying a composition to a bitumen-concrete substrate, said bitumen-concrete substrate having a thickness of at least 3 cm, at a quantity of from 0.5 kg/m2-2 kg/m2 so as to form an essentially water-impervious surface layer, said composition consisting of:

a monomer or a monomer mixture selected from the group consisting of from about 10-20 weight-percent of methyl methacrylate, styrene and acrylate, and a combination thereof:

15-25 weight-percent of bitumen;

50-80 weight-percent of a mineral particulate filler;

and 0.1-1 weight-percent of a UV protective and formulation stabilizing agent.

10. The process for producing a concrete surface according to claim 9, wherein said bitumen-concrete substrate layer contains less than 5 percent by weight bitumen or an equivalent thereof.

11. The process for producing a concrete surface according to claim 9, wherein said bitumen-concrete substrate layer has a thickness of 3-5 cm.

* * * * *